Figure 1:
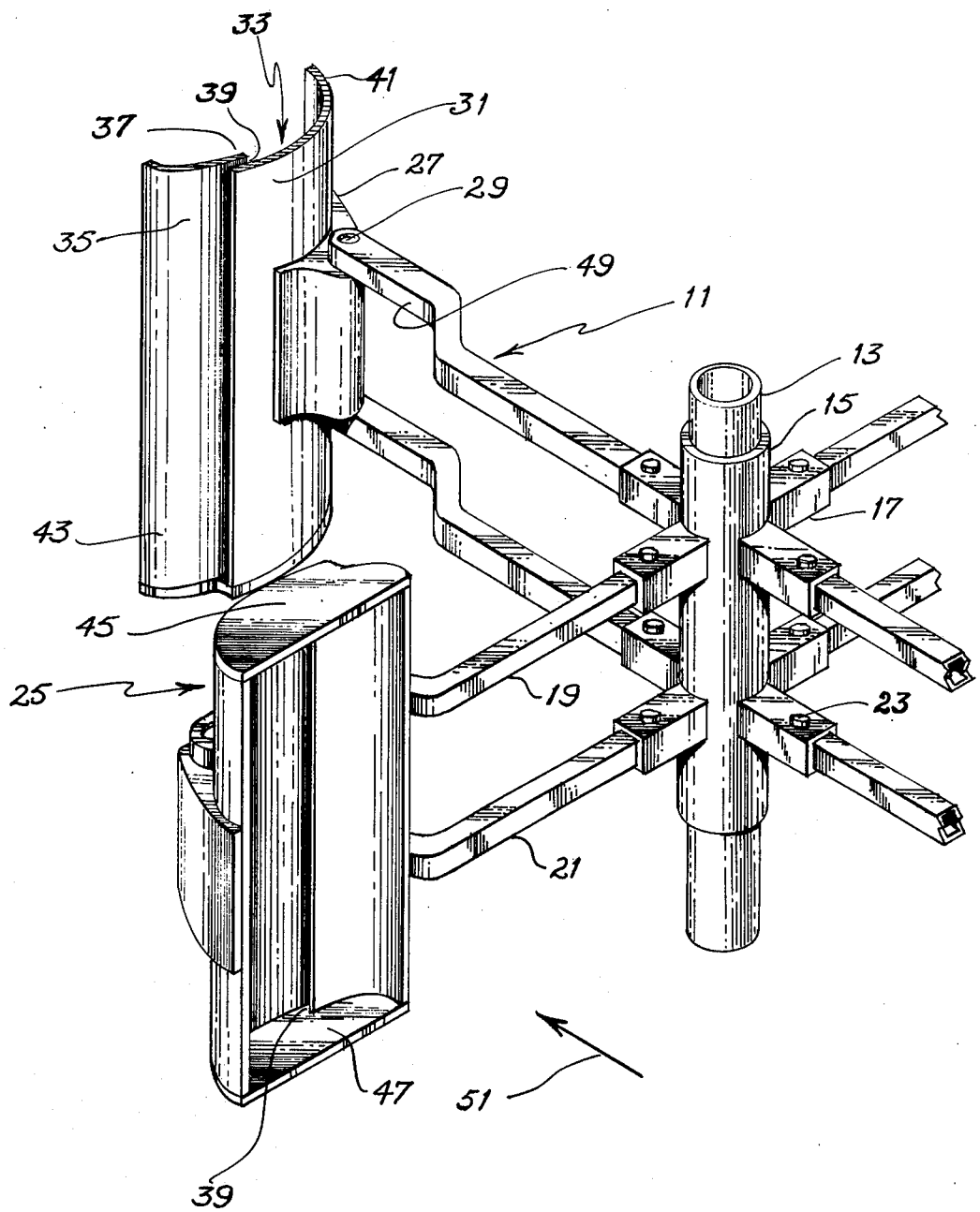

United States Patent [19]

Darvishian

[11] 4,015,911
[45] Apr. 5, 1977

[54] HIGHER EFFICIENCY WIND MOTOR WITH RECEPTORS OF DIMINISHED DRAG CHARACTERISTICS

[76] Inventor: Arthur Darvishian, 5314 Sheridan Drive, Williamsville, N.Y. 14221

[22] Filed: July 28, 1975

[21] Appl. No.: 599,656

Related U.S. Application Data

[63] Continuation-in-part of Ser. No. 432,031, Jan. 9, 1974, Pat. No. 3,897,170.

[52] U.S. Cl. .......................... 416/119; 416/197 A; 416/231 B
[51] Int. Cl.² ........................................... F03D 3/06
[58] Field of Search ............. 416/197 A, 119, 111, 416/231 B

[56] References Cited
UNITED STATES PATENTS

| | | | |
|---|---|---|---|
| 387,102 | 7/1888 | Nagel | 416/197 A X |
| 752,764 | 2/1904 | Dunne | 416/197 A X |
| 1,076,713 | 10/1913 | Southwick | 416/119 |
| 1,342,318 | 6/1920 | Yanacopoulos | 416/197 A |

FOREIGN PATENTS OR APPLICATIONS

| | | | |
|---|---|---|---|
| 187,872 | 1/1956 | Austria | 416/197 |
| 555,175 | 6/1923 | France | 416/117 |
| 916,370 | 12/1946 | France | 416/197 |
| 150,174 | 4/1904 | Germany | 416/119 |

*Primary Examiner*—Everette A. Powell, Jr.
*Attorney, Agent, or Firm*—Raymond F. Kramer

[57] ABSTRACT

A wind motor for the conversion of wind power to mechanical or electrical power or other form thereof includes a plurality of wind receptors which have openings therein for the passage of air therethrough during operation of the wind motor, especially when the receptors are moving against the wind, so as to diminish air resistance (drag) opposing such movement, thereby increasing the efficiency of the wind motor.

7 Claims, 2 Drawing Figures

HIGHER EFFICIENCY WIND MOTOR WITH RECEPTORS OF DIMINISHED DRAG CHARACTERISTICS

This application is a continuation-in-part of my application Ser. No. 432,031, filed Jan. 9, 1974, for Wind Motor, now U.S. Pat. No. 3,897,170.

Horizontal windmills or wind motors, wherein wind receptors or sails rotate in a horizontal plane about a vertical axis, possess an important functional advantage over conventional windmills because the receptors thereof are always capable of being turned by the wind and the mill does not have to be especially positioned to face it. Such horizontal windmills, preferably having a plurality of curviform receptors joined by horizontal arms to a vertical shaft, if fixed in position with respect to such shaft, have the wind exerting a drage thereon when they are moving against it. Accordingly, the drag available from such wind motors is proportional to the difference between that imparted to the receptors or sails when they are moving in the direction of the wind and that opposing such movement when they are moving against it, less frictional losses. In my parent U.S. Pat. No. 3,897,170, there was described a wind motor having receptors which moved between power and feathering positions during rotation so as to receive full power from the wind when moving with it and to diminish drag when moving against it. Diminution of drag during feathering was effected by presenting lesser areas of the receptors to the wind than would have been the case had the receptors been stationary with respect to the rotating arms. Although the use of such receptors in the horizontal wind motor, which receptors were curviform and conformed in contour to the curvatures of arms on which they were movably mounted, increased the efficiency of the wind motor substantially, in some cases, between 30 and 50%, further experimentation has indicated still greater efficiency of operation can be obtained by additional diminution of drag on the receptors, especially when they are moving against the wind and across it.

It is an object of the present invention to increase the efficiency of operation of horizontal windmills by providing receptor structures which diminish receptor drag, especially when the receptors are moving against the wind (or at an angle to it).

In accordance with the present invention a self-adjusting wind motor comprises a wind receptor that moves substantially in a plane of the wind and which automatically is presented to the wind in a position of higher resistance to the wind when moving in the direction of the wind and in a position of lower resistance to the wind when moving against the wind, said adjustment of position being automatic and being caused by the action of the wind and centrifugal force on the receptor, which receptor has an opening therein for passage of air therethrough during operation thereof to diminish air resistance to movement of the receptor. In a preferred embodiment of the invention the receptor is rotatable with respect to a mounting arm on which it is pivoted and the opening therein is a shrouded vertical opening of a certain type in the receptor wall. In other aspects of the invention the opening may be made by movable louvers in the movable receptor or by movable louvers in a fixed position receptor.

Figure 2:
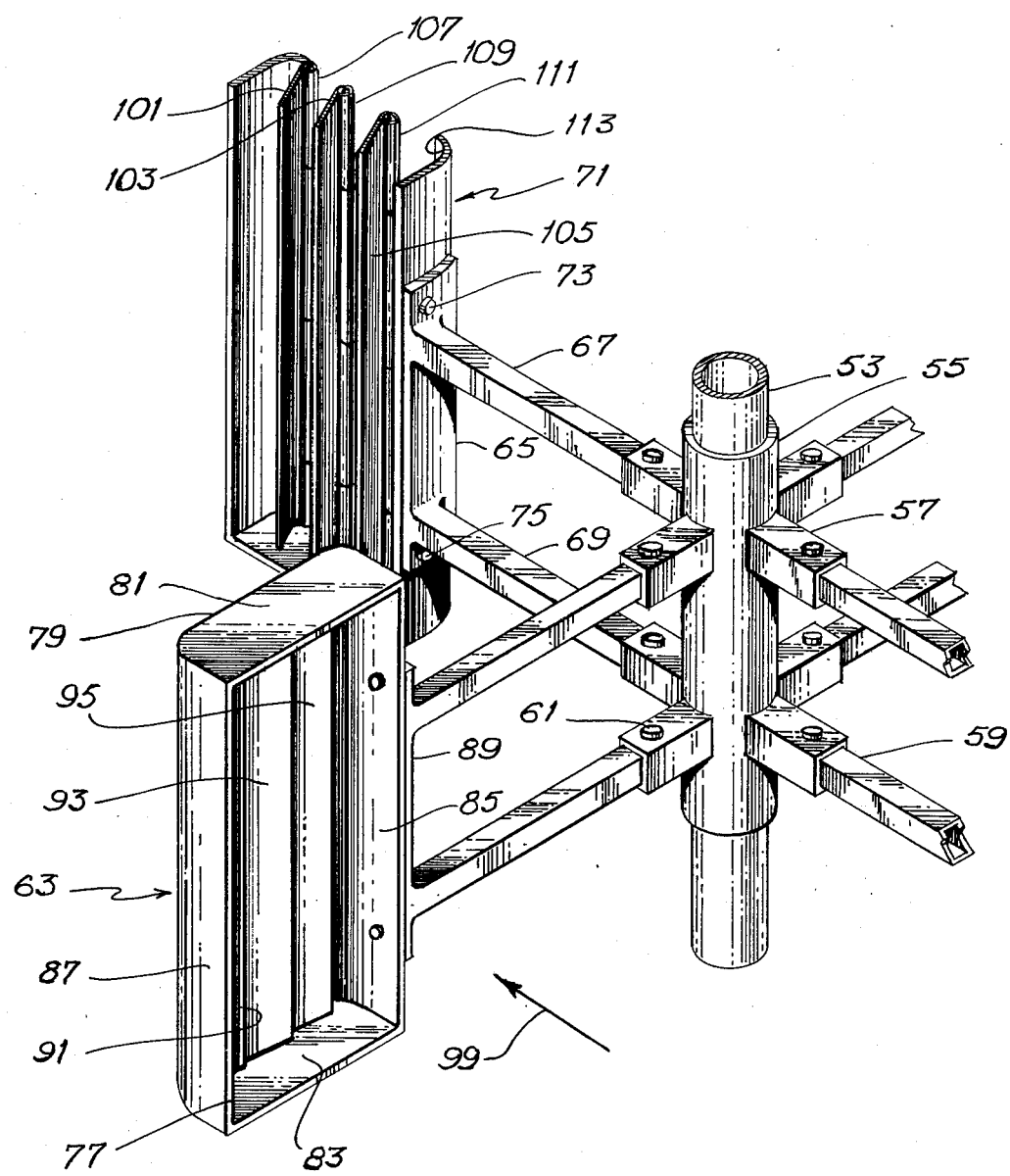

The invention will be readily understood by reference to the description in this specification, taken in conjunction with the drawing in which:

FIG. 1 is a partial perspective view of the essential parts of a preferred embodiment of the wind motor, including receptors shown in two positions, during rotation, moving with the wind and moving across it (others go against it) and rotatable shaft means, rotated by wind action on the receptors, and connecting arms, from which shaft mechanical, electrical or other form of energy may be obtained; and FIG. 2 is a similar view of another embodiment, showing louvers thereof in closed position (maximum resistance to the wind, when moving with the wind) and in open position when moving across it.

In FIG. 1 numeral 11 designates a preferred embodiment of the wind motor of this invention which includes vertical cylindrical shaft 13, collar 15 fastened to the shaft by set screws, a key-keyway combination, a pin through matching openings, friction fits, welding or other suitable means, not illustrated, arm holders 17 affixed to collar 13 and arms 19 and 21 of cross-sectional shape essentially the same as that of the internal openings in holders 17, positioned in such holders and held firmly with respect thereto by set screws 23, which arms are connected to receptor 25 by mounting bracket 27 and hinge pin 29. Mounting bracket 27 is held to a portion 31 of the "closed" side 33 of receptor 25. Another, usually smaller portion of side 33, the "shrouding" portion, is designated by 35 and edge 37 of it covers a part of portion 31, leaving an opening, as at 39, between them for passage of air or wind, when desired. The ends of the side portion, designated by numerals 41 and 43 may be considered as the ends of the receptor, with top 45 (omitted from the illustration of the "upper" receptor for clarity of exposition, particularly with respect to the overlapping of the side portions) and bottom 47 comprising the other elements of the substantially rectangular cross-sectional curviform side-ends receptor.

As illustrated, collar 15 is positively fastened to rotatable shaft 13, which converts to rotational motion the normally rectilinear wind motion, and from the shaft revolutions electricity, mechanical motion, heat energy or chemical energy or other form of energy may be produced. In some embodiments of the invention shaft 13 may be stationary and collar 15 may move about it, transmitting rotational motion from the collar to other means for converting it to a more useful energy form or for otherwise applying the rotational mechanical energy of the collar and doing work with it.

In FIG. 1 arms 19 are both fastened to the receptor via mounting means 27 but it is within the invention to utilize one, three or another number of such supporting arms per receptor. Preferably, however, two such arms are employed and both are curved or shaped near the ends thereof, as at 49, to conform to the shape of the receptor 25 or its mounting brackets 19 and 21 in full power maximum resistance position thereof, as when it is moving with the wind.

In operation, with the wind blowing directly at the open portion of lower receptor 25 (nearer to the viewer) in the direction of arrow 51, receptor 25 is pressed by the wind against bent and fitted portion 49 of arm 19 and against a similar portion of arm 21. The wind thereby causes a clockwise (viewed from above) revolution of shaft 13. As arms 19 and 21 continue to rotate to the position 90° farther on in a clockwise direction the receptor will rotate due to wind action and centrifugal force to a position about 180° from that which it assumed when it was pressed against arms 19 and 21 by the wind. This position is shown in the drawing (FIG. 1) for the other receptor. In some instances, it may not have moved that far but usually it will no longer be conforming to arms 19 and 21. As rotation continues the receptor 25 will be in approximately the same position with respect to the arms after another 90° movement, as it is in the illustrated upper position in FIG. 1 and will be in a position similar to the power position with respect to the arms another 90° further on. These latter two positions correspond to locations of the arms like those indicated in FIG. 1 (which do not show the additional receptors at the ends of the arms). Thus, it is seen that to diminish wind resistance receptors 25 move during rotation of the windmill and thereby they cut the wind resistance when moving against the wind or across the wind, compared to what it would have been for receptors fixed in position with respect to the arms. Still, as is seen from the upper receptor shown in FIG. 1, during rotation there will be times when a substantial proportion of the receptor is moving against the wind or across its path and the wind resistance to such movement will tend to cut down on operating efficiency of the windmill. Accordingly, openings like that shown at 39 are provided to allow passage of air through the receptor wall, breaking any vacuum that might oppose the clockwise motion of the windmill (of course the mills can be designed for opposite motion, too) and increasing operating efficiency. A similarly desirable effect may be obtained even when the receptor is in a position of maximum resistance to the wind (when it is moving with the wind) as in the position of the nearer receptor in FIG. 1. As is seen from the drawing, when the wind strikes against the shrouding portion of the receptor wall it pushes the receptor in a clockwise direction and spills from the outer (away from the shaft) portion of the receptor. In doing this, it creates a partial vacuum and the passage of air through the vertical thin rectangular passageway or opening 39, relieves any backside pressure on the receptor that would otherwise oppose its motion. The gap between main receptor wall and shrouding receptor portion may be hinged or otherwise built to be adjustable, which allows additional opening thereof during high winds, to slow the mill.

In actual usage the described wind motor will be most suitable for employment in winds ranging from about 5 to 70 kilometers per hour and will often be of sizes from about 0.5 to 10 meters high by about 0.2 to 5 meters wide, preferably 2 to 6 meters high by 0.5 to 3 meters wide, with the proportion of height to width being in the range of about 1.5:1 to 5:1. The depth of the curviform receptacles will usually be from 0.2 to 0.9 times the width, preferably 0.3 to 0.6 times such width and the horizontal cross-sectional shape of the receptor will be like a somewhat flattened hemi-cylinder. The passageway between the shrouding and other portion of the receptor side will normally extend from top to bottom thereof, although passageways covering 10 to 90% of such distance, sometimes from 20 to 70% thereof, are also useful. The cross-sectional area of the passageway will normally be from 2 to 20%, preferably from 3 to 10% of the cross-section of the receptor along the open side thereof and the opening will usually be from 5 to 20% of the depth of the receptor (or the radius of the hemi-cylinder) or 1 to 20 centimeters. The shrouding overlap is about 2 to 20% of the receptor width, preferably 5 to 10% thereof, usually 5 to 15 cm.

The above measurements and proportions also apply when the receptor of FIG. 1 is of definite airfoil shape, with the leading edge thereof outermost in high power position and with the pressure relieving opening nearer to the trailing edge. Such airfoils may be strengthened by horizontal ribs internally positioned therein, which essentially convert them into a plurality of airfoil receptors.

The materials of construction for the windmills may be any suitable such materials normally employed for lignt-weight but sufficiently strong windmill parts. Among these are fiberglass-reinforced polyesters, other fiber-reinforced polymeric materials, aluminum, nylon, engineering resins and specially strong tempered or alloy steels, the latter two preferably being light in construction to compensate for their higher densities. Various other such materials are described in my parent U.S. Pat. No. 3,897,170, which is incorporated herein by reference, and various modifications and applications of the present windmills are also described therein, which are incorporated by reference herein and which may be employed in conjunction with the presently described invention. For example, tethers may be employed to limit the swings of the receptors in responses to centrifugal forces and the wind, and shock absorbers may be utilized. Also, in some variations of the apparatus the receptors described may be replaced by dish-like or similar receptors so long as openings are provided to allow air flows through the receptors and the accompanying relief of pressure opposing receptor movements. Instead of four receptors per unit, from three to eight and sometimes more may be utilized and a plurality of banks of receptors may be present on the same shaft or collar. Surfaces of the receptors may be coated with polytetrafluoroethylene or similar lubricating or smooth coating to diminish frictional losses and to prevent sticking of snow, soot and other deposits to the receptor surfaces. Also, the present wind motors, while most useful in "stationary" form, may also be employed as propulsion means, either directly or through motor-generator combinations, to drive automobiles, trucks, ships, all-terrain vehicles and amphibian vehicles. Furthermore, modifications of the present receptor and arm structures may be made so as to make it possible readily to move the receptors inwardly toward the vertical shaft at low wind speeds and outwardly when wind speeds are higher.

In the embodiment illustrated in FIG. 2 the shaft, collar, arm holders, portions of the arms and set screws, numbered 53, 55, 57, 59 and 61, respectively, correspond to those of FIG. 1 but receptors 63 and 71 and mounting means 65 and 89 are different. The receptors are held in fixed positions with respect to arms 59, collar 55 and shaft 53 by means of mounting plates 89 and 65, the latter of which joins arms 67 and 69 and is fastened to receptor 71 by screws 73 and 75. Receptors 63 and 71 are of substantially vertical rectangular box-like structure having an open side, as at 77, an openable and closable side 79, a top 81, a bottom 83 and near and far ends 85 and 87, respectively. It will be seen that with the fastening of end 85 to plate 89 receptor 63, unlike that of FIG. 1, is not pivotable to be feathered by the wind. However, hinged louvers, 91, 93 and 95 close to prevent escape of wind through the receptor when it is in position of maximum resistance to the wind, when traveling with the wind. Due to centrifugal force and change of direction of the receptor with respect to the wind direction, shown by arrow 99, as the wind motor rotates, in a position 90° advanced from the high resistance position of the receptor its appearance will be like that of receptor 71, from which the top has been removed for improved clarity. Receptor 71 includes three louvers 101, 103 and 105, which are hinged respectively to hinges 107, 109 and 111. In the open position illustrated air may pass between the louvers, cutting down on drag as receptor 71 moves across or against the wind. Similar openings between the louvers are present at subsequent positions before return to the maximum resistance position previously described.

The overlappings of the louvers are by the leading edges against the hinges or louver portions near the hinges of the next louvers and the overlap will normally be from 5 to 20% of a louver width, preferably with a sealant material, such as Teflon, neoprene or polyurethane foam on either or both of the contacting surfaces to prevent air leakage in the desired closed position. In some cases, however, a small amount of air will be allowed to leak through to relieve any pressure opposing movement of the receptor, even in the power stroke or maximum resistance position. Generally, the proportion of louver space or openable and closable side that will be allowed to remain open at the power portion of the receptor will be 2 to 20%, preferably 5 to 10% of such side but in many cases no opening will be provided.

The illustrated receptors have rounded edges between ends 87 and 85 and openable and closable side 79. End louver 105 closes against an inwardly curved side portion 113 when in maximum power position. In open position, as receptor 71 is illustrated, the ends of louvers 101, 103 and 105 all remain within the bounds of the box-like structure of the receptor 71, which helps to maintain the integrity of the louvers and their orientations. As is seen in the illustration of receptor 63, the hinges of each louver are located on the outer side thereof, considering the inner sides to be those nearer to shaft 53.

In FIG. 2 the louvered feathering mechanism illustrated is on stationary receptors, stationary with respect to the mounting arms, etc. However, in a preferred embodiment of this invention, the louvers may be employed on a featherable receptor, pivotally mounted by means of mounting means such as that illustrated in FIG. 1 and identified by numerals 27 and 29. Such a structure provides double feathering actions, both with respect to the receptor body itself and by opening a wall thereof when the receptor is not in its maximum power position, i.e., when it is moving against the wind and often when it is moving across the wind. Materials of construction for this embodiment of the invention, as well as for the structure illustrated in FIG. 2, may be essentially the same as those described for the apparatus of FIG. 1.

Although the improvements in efficiencies of the present apparatuses, especially those of FIG. 1 and the described hybrid apparatus (combining structures of FIGS. 1 and 2) may be only on the order of 3–15%, sometimes 5–10%, this increase in efficiency is obtained with essentially no additional expense in apparatus construction costs and therefore the new structure is a useful improvement over that of my parent patent. The use of such new structure is especially desirable when wind velocities are low because the differences in efficiencies obtained are often sufficient to start the mill moving (to overcome static friction), making it possible to operate for greater proportions of the time in which the wind is blowing at low speed and thereby to increase the power available from the wind mill be even more than the 3 to 15% efficiency improvement mentioned.

The invention has been described with respect to illustrations of various embodiments thereof but is not to be limited to these because it is evident that one of skill in the art, with the present specification before him, will be able to utilize substitutes and equivalents without departing from the spirit and scope of the invention.

What is claimed is:

1. A self-adjusting wind motor comprising a plurality of wind receptors that move substantially in the plane of the wind, which automatically are presented to the wind in positions of higher resistance to the wind when moving in the direction of the wind and move into positions of lower resistance to the wind when moving against it, said automatic adjustment of positions being caused by the action of the wind and centrifugal force on the receptors, said receptors each having an opening therein for passage of wind therethrough during operation thereof when moving across the wind and against the wind to diminish resistance to said movements, a substantially vertical shaft and a plurality of arms held to the shaft or to a collar thereon, said wind receptors being mounted on said arms, so that the receptors and arms rotate substantially horizontally with the shaft and/or collar thereon in response to wind pressure, with the receptors being pivoted with respect to the mounting arms, with the pivot locations being on outer portions of the receptors.

2. A wind motor according to claim 1 wherein the shaft is vertical and each of the receptors includes a curvifrom wind-receiving surface, a concave surface of which is presented to the wind when the receptors are moving with the wind and an end of which is presented to the wind when the receptors are moving against the wind.

3. A wind motor according to claim 2 wherein the receptors are of flat and substantially hemi-cylindrical shape with substantially vertical axes and the openings therein are passageways extending upwardly.

4. A wind motor according to claim 3 wherein in each receptor the opening is a vertical passageway between back portions of a wall thereof, which wall includes a portion nearer to the shaft at the position of higher wind resistance partially shrouding a portion of the receptor wall farther away from the shaft.

5. A wind motor according to claim 4 wherein the substantially hemi-cylindrical receptor includes a top and a bottom and the opening between the receptor sections is of a cross-sectional area between about 2 and 20% of the cross-sectional area of the receptor.

6. A wind motor according to claim 5 wherein the opening in the receptor is a vertical opening located in the receptor's curved wall nearer to the side of the receptor nearer to the shaft when the receptor is in position of greatest resistance to the wind than to the other side of the receptor, the receptor is mounted on a pair of arms fastened to a collar held to the shaft, said mounting is pivotal mounting by means of a mounting member held to the outer portion of the receptor and the inner portion of the receptor is held in position with respect to the outer portion thereof by being fastened to top and bottom members fastened to said outer portion of the receptor, so as to produce a passageway between receptor portions which is of elongated vertical rectangular shape, with the inner receptor wall portion shrouding or covering the outer wall portion when the receptor is in a position of high wind resistance and is moving parallel to the wind.

7. A wind motor according to claim 6 wherein the passageway between receptor portions is of a cross-sectional area between 3 and 10% of the cross-sectional area of the receptor, the shrouding receptor inner portion shrouds a corresponding outer portion a distance which is from about 2 to 20% of the width of the receptor, the receptor is of greater height than width, with the height:width ratio being in the range of 1.5:1 to 5:1 and the mounting arms are curved or bent near the receptor and shaped so as to maintain it in a position of maximum resistance to the wind when the receptor is moving with the wind.

\* \* \* \* \*